United States Patent [19]

Benham et al.

[11] Patent Number: 5,004,646

[45] Date of Patent: Apr. 2, 1991

[54] PROCESS FOR TREATING METAL SURFACES

[75] Inventors: Harold L. Benham; James A. Mitchell, both of Middlesex, England

[73] Assignee: The British Petroleum Company p.l.c., London, England

[21] Appl. No.: 329,723

[22] Filed: Mar. 14, 1989

[30] Foreign Application Priority Data

Mar. 19, 1988 [GB] United Kingdom ............... 8806590

[51] Int. Cl.$^5$ .................. B32B 15/00; B32B 7/12
[52] U.S. Cl. .................... 428/344; 427/327; 427/435; 428/461
[58] Field of Search .............. 428/461, 343, 344; 427/327, 435; 558/114

[56] References Cited

U.S. PATENT DOCUMENTS

3,686,371  8/1972  Hasegawa ........................ 558/114

FOREIGN PATENT DOCUMENTS

134699   3/1985  European Pat. Off. ............ 427/327
2161943  7/1973  France ............................. 427/327

OTHER PUBLICATIONS

Derwent Abstract 88/09928/15, DNIN 08/10/86.
Derwent Abstract 88-04738/07, MITR 25/06/86.
Derwent Abstract 87-254668/36, AGEN 30/01/86.
Derwent Abstract 87-130619/19, JOHS 31/10/85.
Derwent Abstract 87-059971/09, KURS 10/07/85.
Derwent Abstract 87-053125/08, FUJF 04/07/85.
Derwent Abstract 87-059971/09, KURS 10/07/85.
Derwent Abstract 88-152081/22, JAPC 08/10/86.
Derwent Abstract 88-151531/22, SUMO 07/10/86.
Derwent Abstract 88-152081/22, JAPC 08/10/86.
Derwent Abstract 88-127435/19, KCL 03/11/86.
Derwent Abstract 87-230850/33, NISY 27/12/85.
Derwent Abstract 87-176976/25, NIPK 22/02/85.
Derwent Abstract 87-168219/24, RICO 30/10/85.
Derwent Abstract 87-168094/24, SUMO 29/10/85.
Derwent Abstract 87-143166/20, MINN 22/10/85.
Derwent Abstract 87-168094/24, SUMU 29/10/85.
Derwent Abstract 87-104136/15, MITR 30/08/85.
Derwent Abstract 87-104134/15, MITR 29/08/85.
Derwent Abstract 87-101152/14, MINN 22/10/85.
Derwent Abstract 87-076537/11, NIPA 30/07/85.
Derwent Abstract 86-316249/48, SUNZ 10/04/85.
Derwent Abstract 86-288464/44, MITR 18/03/85.
Derwent Abstract 86-316249/48, SUNZ 10/04/85.
Derwent Abstract 86-288464/44, MITR 18/03/85.
Derwent Abstract 86-259320/40, KAOS 20/03/85.
Derwent Abstract 86-259319/40, KAOS 20/03/85.
Derwent Abstract 86-248701/38, TOAG 23/10/84.

*Primary Examiner*—Thomas J. Herbert
*Attorney, Agent, or Firm*—Larry W. Evans; Joseph G. Curatolo; Teresan W. Gilbert

[57] ABSTRACT

Metal surfaces are treated with an aqueous medium containing a phosphate diester of a hydroxyacrylate or methacrylate containing a hydrocarbon chain having from 7 to 16 carbon atoms. The treated metal surfaces give improved retention of adhesive strength when adhesives are subsequently applied.

19 Claims, No Drawings

PROCESS FOR TREATING METAL SURFACES

This invention relates to novel phosphate esters of hydroxyalkylacrylates and hydroxyalkylmethacrylates.

Phosphate mono and diesters of hydroxyalkylacrylates are known. U.S. Pat. No. 3,686,371 discloses the preparation of the phosphate monoester of 2-hydroxyethylmethacrylate.

Published European Patent specification EP No. 0134699A discloses a method of inhibiting corrosion of a metal surface by treating the surface with a phosphate monoester of the formula:

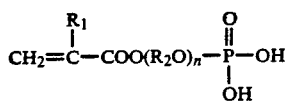

where $R_1$ is H, methyl or ethyl, $R_2$ is an alkyl group having from 2 to 10 carbon atoms, and n is a positive integer in the range 1 to 20, optionally in the presence of the diester. However, the only disclosed compounds are the phosphate mono and diester of 2-hydroxyethylmethacrylate.

There is no suggestion that any advantage will be obtained by making phosphate esters in which n is greater than 1.

It is desirable that a surface treatment of metals results in adhesion promotion of subsequently applied adhesive bonds. It is also desirable to be able to use a reagent in low concentrations and that the application of such a reagent is tolerant of a wide range of application conditions.

We have now found that by selecting certain compounds falling within the general disclosure of EP No. 0134699A, unexpectedly advantageous results can be obtained when they are used to treat metals.

According to the present invention, there is provided a method of treating a metal surface comprising contacting the metal surface with an aqueous medium containing at least one compound having the general formula (I):

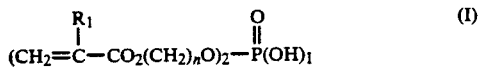

where
$R_1$ is a methyl group, or H,
n is an integer greater than or equal to 7 and not more than 16.

$R_1$ is preferably a methyl group. A preferred range of compounds is defined by $8=<n<=12$, more preferably $8<n<12$. Particularly preferred phosphate esters are the phosphate diester and monoester of 10-hydroxydecylmethacrylate.

The phosphate esters of the present invention can be applied to all metal surfaces especially iron, steel and aluminium more especially mild steel. The esters are applied in aqueous solution or as dispersions. The esters are not suitable for application to plastic surfaces, or glass.

According to a further aspect of the present invention, there is provided a composite structure which comprises in sequence,
(a) a metal surface
(b) a layer of a compound of general formula (I)
(c) a layer of a polymer having adhesive properties and copolymerisable with the compound of general formula (I).

A preferred composite structure will comprise two metal articles having surfaces bonded to each other by way of an intervening sandwich structure; the sandwich structure comprising two outer layers of a compound of general formula I and an intervening layer of polymeric adhesive, each outer layer contacting one of the metal surfaces.

The metal articles may for example be mild steel sheets.

The phosphate esters, when used as adhesion promoters, are preferably used in conjunction with adhesives which are copolymerisable with the phosphate ester acrylate or methacrylate end group. The adhesive is preferably an acrylic type.

PREPARATION OF PHOSPHATE ESTERS

The phosphate methacrylate esters can be prepared by reacting phosphorus oxychloride with the appropriate ester of methacrylic acid.

The preparations of phosphate diesters of hydroxyalkylacrylates and hydroxyalkylmethacrylates may produce mixtures of the diester with monoester along with the unreacted hydroxyalkylacrylate or the hydroxyalkylmethacrylate. Separation of the components of the mixture can be tedious and time consuming. However, it is generally not necessary to isolate particular components of the mixture, since the composition of the mixture can be tailored to its end-use by controlling the extent of esterification.

APPLICATION OF PHOSPHATE ESTERS

The phosphate esters can be applied to metal surfaces prior to the application of adhesives in order to increase the bond strength between the metal surface and the adhesive. In addition, the durability of the adhesive bonds will usually be improved by application of compounds of the present invention.

The phosphate ester is applied from an aqueous medium. The phosphate ester has a low but finite concentration in water. Consequently it is usually applied using aqueous media which comprise both dispersed and dissolved ester. This ensures that upon application complete coverage of the surface is rapidly obtained. Because of the low solubility of the phosphate in water, the effectiveness of the ester is insensitive to concentration of the ester down to low levels e.g. to about 0.1% by weight. This has the added advantage of avoiding wastage while maintaining the effectiveness of the ester. The solubility of the phosphate ester will vary according to molecular weight and structure. Therefore the optimum concentration of any given phosphate can be found by simple tests.

The application of the phosphate esters to metal surfaces is treatment-tolerant. This means that little or no preparing of the metal surface is needed and few control safeguards are needed in the application process. The metal surface does not need preparation prior to phosphate ester application by either chemical methods (e.g. chromic acid) or mechanical methods (e.g. grit-blasting). The phosphate coating can be applied in a variety of ways, for example brushing, spraying or immersion. If an immersion technique is used, then the treatment is not critical with respect to temperature, dipping time or concentration within specified ranges e.g. 0.05 to 5%, preferably 0.1–1% for diester phosphate of 10-hydroxydecylmethacrylate (DP-10). Thus, the metal surface may for example be contacted with the aqueous medium containing (I) at temperatures in the range 0° C. to 70° C. more preferably 10° to 60° C., and for times in the range 0.5 to 40 minutes.

The invention will now be described by reference to the following experiments in which experiments identified by number are examples of the invention and experiments identified by letter are comparative tests not according to the invention.

EXAMPLE 1

Preparation of Phosphate Diester of 10-Hydroxydecylmethacrylate

Unless stated otherwise all reagents noted below were ex Aldrich and used directly. The THF (tetrahydrofuran) contained 0.1 percent quinol as stabiliser.

The synthetic scheme used to synthesise (a) 10-hydroxydecylmethyacrylate and (b) the phosphate diester is indicated below:

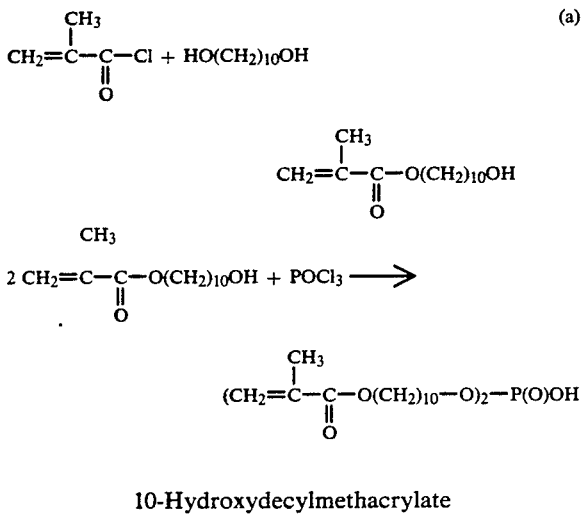

10-Hydroxydecylmethacrylate 17.4 g (0.1 mol) of 1,10-decanediol was dissolved in 40 ml THF in round-bottomed, twin necked, 150 ml flask. The mixture was stirred and maintained at 35° C. to effect complete dissolution. The resultant green solution was then closed to the atmosphere, and 8.5 g pyridine added. 10.4 g (0.1 mol) of methacryloyl chloride was then dripped slowly into the reactive solution over a period of two hours; the reaction temperature being maintained at 30° C. Over this addition time, a white precipitate of pyridinium hydrochloride formed.

After all the acid chloride had been added the reaction mixture was allowed to cool to ambient, and the precipitated salt filtered through a celite-packed sintered glass funnel. Water (50 ml) was added to the viscous yellow filtrate and the organic layer extracted with ether (50 ml). This latter mixture also produced two layers. The major organic phase was separated, and dried over sodium sulphate. The dry solution was then evaporated in a rotary evaporator for ca 6 hours at 30° C. to leave a viscous green slurry, which was filtered to give 8.5 g of solid. Conversion was therefore 35 percent, (assuming pure material).

Phosphate Diester of 10-Hydroxydecylmethacrylate (DP10)

4.84 g (0.02 mol) 10-hydroxydecylmethacrylate (HDMA) and 1.7 g pyridine (0.02 mol) were added to 30 ml THF in a two-necked, 250 ml round bottomed flask, itself suspended in an ice-bath. The solution was stirred until the liquid temperature was approximately 0°–5° C. At this point 1.54 g $POCl_3$ (0.01 mol), dissolved in 30 ml THF, was added dropwise to the cooled liquor over a period of two hours.

Once more, after addition was complete, the precipitated hydrochloride salt was filtered off (as previously), and washed with THF. The combined filtrate and washings were then added dropwise over a period of one and a half hours to a cooled, stirred solution of potassium carbonate (1.4 g, 0.01 mol) in 30 ml distilled water. The clear carbonate solution had turned orange/brown by the end of the filtrate addition. Finally, 0.95 ml conc. HCl (36 percent w/w solution), diluted in 10 ml distilled water, was slowly introduced to the reaction mixture and the orange coloration gradually paled over this time. An upper, dark brown oily layer was formed by this process. A small amount of acid (0.5 ml) was added to work up any mono-ester present.

The product, a dark brown oil, was obtained by two extractions of the organic layer using methylene chloride, drying over sodium sulphate, and evaporation in a rotary evaporator. Yield=2.75 g (50 percent conversion based upon HDMA). $^{31}P$, $^{13}C$ and $^1H$ nmr, showed that the product contained 41 percent di-ester, 43 percent mono ester and 15 percent pyrophosphate (The product is hereafter designated DP10).

Comparative Test A

6-Hydroxyhexylmethacrylate

6-Hydroxyhexylmethacrylate was prepared using the same method as in the preparation of 10-hydroxydecylmethacrylate. 1,6-hexanediol was used instead of 1,10-decanediol. The same molar quantities of reactants were used. 11.5 g of product (62% yield) were collected.

Phosphate Diester of 6-Hydroxyhexylmethacrylate (DP6)

The phosphate diester of 6-hydroxyhexylmethacrylate hereinafter referred to as (DP6) was prepared using the same method as in the preparation of DP10 in Examples 1. 6-Hydroxyhexylmethacrylate (0.05 moles) was used instead of 10-hydroxydecylmethacrylate (0.02 moles); all other molar quantities were adjusted accordingly. 5.6 g of product (52% yield) were collected. $^{31}P$ n.m.r. spectrum of the product exhibited a single resonance indicating the presence of a single organophosphorus compound.

Comparative Test B

Preparation of the Phosphate Monoester of Hydroxyhexapropoxymethacrylate (PPM6P)

The phosphate monoester of hydroxyhexapropoxymethacrylate (hereinafter referred to as PPM6P) has the formula:

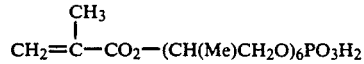

A stirred solution of phosphorus oxychloride (15.3 g, 0.1 mol) in THF (30 ml) was cooled in an ice bath. To this was added a solution of hydroxyhexapropoxymethacrylate (ex BP Chemicals) (43.45 g, 0.1 mol) and pyridine (7.9 g, 0.1 mol) in THF (tetrahydrofuran) (40 ml) over 1.5 h. At the end of this period the precipitated pyridinium hydrochloride was removed by filtration and the residue washed with THF (30 ml). The combined filtrate and washings were then added over a period of 2 h to a stirred solution of potassium carbonate (27.6 g, 0.2 mol) in water (100 ml) at ice bath temperature. This was followed by the dropwise addition of concentrated hydrochloric acid (17 ml, 0.2 mol) over 0.5 h, whilst maintaining ice bath cooling. When the addition had been completed, water (50 ml) was added to dissolve the precipitated inorganic salts. The solution was then extracted with dichloromethane (50 ml; 20 ml) and the combined extracts dried over magnesium sulphate before being evaporated to give a yellow oil in 85% yield.

Comparative Test C

Preparation of the Phosphate Monoester of 10-Hydroxydecylmethacrylate (MP10)

MP10 was prepared using the same method as used in the preparation of PPM6P. However, 10-hydroxydecylmethacrylate (0.025 moles), was used instead of hydroxyhexapropoxymethacrylate (0.1 mols). 6.54 g of product (78% yield) were collected. $^{31}P$ n.m.r. spectrum of the product exhibited a single resonance indicating the presence of a single organophosphorus compound.

EXAMPLES 2-4

Adhesion Testing

The material prepared in accordance with Example 1 was tested for adhesion promotion using aqueous dispersions of DP10 with different concentrations (given in Table 2).

Adhesion promotion was measured as a lap shear strength (MPa) of an overlap joint between two test coupons. The experimental details are given below:

All test panels measured 10.16×2.54×0.16 cm. The adhesive composition used was as shown in Table 1.

TABLE 1

Adhesive Composition
The adhesive is a two-part system consisting of the following:

|  |  | Typical Mixture |
|---|---|---|
| Part I |  |  |
| Methyl methacrylate | 100 pts | (5.00 g) |
| Benzoyl peroxide | 1 pt | (0.05 g) |
| Part II |  |  |
| Poly(methyl methacrylate) | 100 pts | (5.00 g) |
| Sodium benzenesulphinate | 3 pts | (0.15 g) |
| N,N-bis-(2-hydroxyethyl)-p-toluidine | 1 pt | (0.05 g) |

The adhesive mixture was prepared by mixing Part I and Part II in a ratio of 2:1. This material was stirred thoroughly and then used as quickly as possible.

Surface Treatment

Mild steel test coupons (CR1 grade) were immersed to a depth of about 5 cm in an aqueous dispersion of adhesion promoter for one minute. The coupons were then removed, rinsed with deionised water and dried using a jet of compressed air.

Joint Formation and Strength Evaluation

The adhesive was applied to a pretreated panel, which was then joined with another panel to form an overlap joint 2.54×1.27 cm in size. The joint was held in place during the curing period using foldback clips.

Four lap joints were prepared for each experiment. The joints were then pulled apart under tension using an Instron device. A crosshead speed of 1 mm min$^{-1}$ was employed. Figures quoted in the text are the average breaking stress values for the four joints, converted into MPa (N mm$^{-2}$).

Accelerated Durability Test

Joints were immersed in a stirred water bath which was thermostatically controlled to 40° C.±1° C. Sets of 4 joints were removed for testing at 5 day intervals up to 30 days. The joints were allowed to dry out for at least 48 hours prior to strength evaluation.

Surface Preparation

Trichloroethylene cleaning procedure: coupons were dipped in TCE for 1 minute then wiped dry with a clean tissue.

Comparative Tests D-K

Experiments were carried out using the procedures of Example 2 but using the following materials instead of DP10, namely: DP6 (as produced in Test A) (Test D), MP10 (as produced in Test C) (Test E), PPM6P (as produced in Test B) (Tests F and G), the phosphate monoester of 2-hydroxyethylmethacrylate (commercially available from Kayamer) hereinafter referred to as HEMA P (Tests H and I), and an acrylic silane $CH_2=C(Me)CO_2(CH_2)_3Si(OMe)_3$ (commercially available from Fluka Chemicals).

When the silane adhesion promoter was employed, a 1.0% aqueous solution of that material was prepared then allowed to stand for 1 hour prior to use, in order to effect hydrolysis to the more active silanol form.

Table 2 shows the results of pretreating mild steel coupons with a variety of different adhesion promoters at varying concentrations:

TABLE 2

Breaking Stress of Mild Steel Lap Joints Pretreated with Different Concentrations of Adhesion Promoters

| Experiment | Adhesion Promoter | Concentration % | Lap Shear Strength (MPa) |
|---|---|---|---|
| 2 | DP10 | 1 | 35.5 c (2.6) |
| 3 | DP10 | 0.1 | 35.3 c (2.1) |
| 4 | DP10 | 0.01 | 14.1 c/a (1.1) |
| D | DP6 | 0.1 | 8.6 a/c (1.3) |
| E | MP10 | 0.1 | 14.4 c/a (0.9) |
| F | PPM6P | 0.1 | 26.7 c (2.3) |
| G | PPM6P | 0.01 | 7.8 a (1.9) |
| H | HEMA P | 1.0 | 18.1 c/a (7.5) |
| I | HEMA P | 0.1 | 9.4 a (1.7) |
| J | Acrylic silane | 0.1 | 2.1 a (0.4) |
| K | Acrylic silane | 1.0 | 12.0 a (1.7) | c = cohesive failure, a = adhesive failure
Standard deviations are given in parentheses
All joints 2.54 × 1.27 cm overlap.

The results clearly indicate that the diester (DP10) is more effective than the monoester (MP10) and both PPM6P and acrylic silane (at 0.1% concentration). The concentration insensitivity of DP10 over the range 1-0.1% is also illustrated.

EXAMPLES 5 AND 6

Example 3 was repeated using an aluminium (2024 grade) and stainless steel (316) test coupons respectively. The results are shown in Table 3.

Tests L and M

Examples 5 and 6 were repeated using PPM6P in place of DP10. The results are shown in Table 3.

TABLE 3

Breaking Stress of Aluminium and Stainless Steel Lap Joints Pretreated with Phosphate Adhesion Promoters

| Metal | Breaking Stress (MPa) after Pretreatment with: | |
|---|---|---|
| | Examples 5 and 6 DP10 (0.1%) | Tests L and M PPM6P (0.1%) |
| Aluminium | 14.5 a (2.3) | 3.4 a (0.7) |
| Stainless steel | 21.7 c/a (1.4) | 9.5 a (0.7) | c = cohesive failure, a = adhesive failure
Standard deviations are given in parentheses
All joints 2.54 × 1.27 cm overlap In the cases of both aluminium and stainless steel, DP10 is more effective as an adhesion promoter than PPM6P.

EXAMPLE 7

Lap jointed mild steel coupons were prepared as in Example 2 with the concentration of DP10 in the aqueous dispersion used to treat the mild steel coupons being 0.1% wt, and using a commercially available acrylic adhesive Permabond F241 (Permabond is a trade mark) in place of the adhesive used in Example 2.

The coupons were then subjected to an accelerated durability test.

Accelerated Durability Test

Joints were immersed in a stirred water bath which was thermostatically controlled to 40° C.±1° C. Sets of 4 joints were removed for testing at 5 day intervals up to 30 days. The joints were allowed to dry out for at least 48 hours prior to strength evaluation.

The results are shown in Table 4.

Comparative Test N

Example 7 was repeated, but without any treatment with DP10. The results are shown in Table 4.

TABLE 4

Accelerated Durability Test Results, Permabond F241 With and Without DP10 Pretreatment

| Immersion Time (hours) | Average Breaking Stress of Mild Steel Lap Joints (MPa) | |
|---|---|---|
| | Example 7 DP10 Pretreatment | Test N No Pretreatment |
| 0 | 19.9 c/a (4.5) | 17.3 a/c (4.8) |
| 120 | 22.0 c (1.1) | 20.1 a/c (3.9) |
| 240 | 23.8 c (2.3) | 18.8 a/c (3.0) |
| 342 | 22.0 c (1.7) | 16.8 a/c (3.8) |
| 480 | 20.5 c/a (1.4) | 12.9 a (2.8) |
| 600 | 19.3 c/a (3.0) | 16.1 a/c (4.0) |
| 744 | 19.5 c/a (2.9) | 11.8 a (3.3) | c = cohesive failure, a = adhesive failure
Standard deviation are given in parentheses
Test temperature 40° C.
All joints 2.54 × 1.27 cm overlap The DP10 pretreatment is clearly effective in maintaining the adhesive bond strength of the lap joint. Where the test coupons were not pretreated, the lap joint strength decreased over the period of the test by approximately 30%.

TOLERANCE TO TREATMENT CONDITIONS

EXAMPLES 8 AND 9

Lap jointed mild steel test coupons made and tested as in Example 3, but with immersion times in the DP10 aqueous dispersion of 10 and 40 minutes. The results together with those for Example 3 (1 minute immersion) are given in Table 5.

Comparative Tests O and P

Examples 8 and 9 were repeated but using 0.1% wt of PPM6P in place of DP10. The results, together with the results from Test F are given in Table 5.

EXAMPLES 10 AND 11

Experiments were carried out as in Example 4, but with immersion times in the DP10 dispersion of 10 and 30 minutes. The results obtained, together with the results from Example 4 are shown in Table 6.

Comparative Tests Q and R

Experiments were carried out as in Examples 10 and 11, but using PPM6P in place of DP10. The results together with those from Test G are shown in Table 6.

DP10's strength builds up quickly and is maintained. PPM6P's drops off after a time.

TABLE 5

| Immersion Time (minutes) | Breaking Stress (MPa) at 0.1% Treatment Level | |
|---|---|---|
| | Example 3, 8 and 9 DP10 Pretreatment | Tests F, O and P PPM6P Pretreatment |
| 1 | 35.3 c (2.1) | 26.7 c/a (2.3) |
| 10 | 34.2 c (3.3) | 26.8 c/a (3.7) |
| 40 | 37.1 c (1.3) | 16.3 a (1.7) |

At very low concentrations DP10 eventually forms a strong bond, PPM6P does not.

TABLE 6

| Immersion Time (minutes) | Breaking Stress (MPa) at 0.01% Treatment Level | |
|---|---|---|
| | Examples 4, 10 and 11 DP10 Pretreatment | Tests G, Q and R PPM6P Pretreatment |
| 1 | 14.1 c/a (1.1) | 7.8 a (1.9) |
| 10 | 31.3 c (0.9) | 9.8 a (1.3) |
| 30 | 35.0 c (1.4) | 2.5 a (0.5)* | c = cohesive failure, a = adhesive failure
Standard deviation are given in parentheses
All joints 2.54 × 1.27 cm overlap
*Plates pitted and corroded.

TABLE 7

Breaking Stress after Pretreatment in 0.1% Adhesion Promoter Solutions at 60° C. for 40 minutes

| Example | Adhesion Promoter | Breaking Stress (MPa) |
|---|---|---|
| 12 | DP10 | 36.5 cohesive (1.0) |
| S | PPM6P | 8.1 adhesive (1.7) |

Standard deviation are given in parentheses.
Joints size 2.54 × 1.27 cm

EXAMPLE 12

An experiment was carried out as in Example 2 but using a 0.1% aqueous dispersion of DP10 at 60° C. for 40 minutes. The results are given in Table 7.

Comparative Test S

Example 12 was repeated using PPM6P in place of DP10. The results are given in Table 7.

Comparative Test T

Example 2 was repeated but using various solvents for the DP10 and various concentrations of DP10. The conditions used and results obtained are given in Table 8 together with those for Example 3.

TABLE 8

Solvent of Application

Table 8 shows the effect of varying the solvent of application. It is clear that DP10 is most effective when applied from water:

| Example | Solvent/Dispersing Medium | Bond Strength (MPa) (2.54 × 1.27 cm overlap) | Standard Deviation (MPa) |
| --- | --- | --- | --- |
| 3 | Water (0.1%) | 35.3 c | 2.1 |
| 5 | Methanol (0.1%) | 1.4 a | 0.3 |
| 11 | CH$_2$Cl$_2$ (0.1%) | 4.8 a | 0.9 |
| | THF (0.1%) | 7.8 c/a | 1.7 |
| | THF (1%) | 24.0 c/a | 1.4 |
| | Toluene (0.1%) | 10.3 c/a | 2.2 |
| | Toluene (1%) | 15.9 c/a | 2.7 |
| | Heptane (0.1%) | 0.9 a | 0.2 |
| | Methyl Methacrylate (0.1%) | 3.5 a | 0.5 |

Raising the concentration of DP10 in e.g. THF or toluene to 1% still did not give equivalent performance. DP10 was dispersed rather than dissolved in heptane or methanol.

We claim:

1. A composite structure which comprises in sequence: (a) a metal article, (b) a layer of a compound of formula (I), (c) a layer of a polymer having adhesive properties and copolymerisable with the compound of formula (I).

2. A composite structure according to claim 1 which comprises in sequence after the polymer layer, a further metal article.

3. A composite structure according to claim 2 wherein the polymer having adhesive properties is an acrylic polymer.

4. A method of treating a metal surface which comprises contacting the metal surface with an aqueous medium containing at least one compound having the general formula:

$$(CH_2=C(R_1)-CO_2(CH_2)_nO)_2-P(OH)_1 \quad \text{(I)}$$
$$\hspace{2cm} \| \atop O$$

where $R_1$ is a methyl group or H, n is an integer not less than 7 and not more than 16.

5. The method according to claim 4 wherein the metal is mild steel.

6. The method according to claim 1 wherein the concentration of the compound of formula (I) in the aqueous medium is in the range 0.5 to 5% by weight based on weight of aqueous medium.

7. The method according to claim 1 wherein the metal surface is contacted with the aqueous medium at a temperature in the range 0° C. to 70° C.

8. The method according to claim 7 wherein the metal is brought into contact with the aqueous medium containing (I) for 0.5 to 40 minutes.

9. A method according to claim 4 wherein $R_1$ is methyl.

10. The method according to claim 9 wherein the metal is mild steel.

11. The method according to claim 9 wherein the concentration of the compound of formula (I) in the aqueous medium is in the range of 0.5 to 5% by weight based on weight of aqueous medium.

12. The method according to claim 9 wherein the metal surface is contacted with the aqueous medium at a temperature in the range of 0° C. to 70° C.

13. The method according to claim 12 wherein the metal is brought into contact with the aqueous medium containing (I) for 0.5 to 40 minutes.

14. The method according to claim 9 wherein n is greater than or equal to 8 and less than or equal to 12.

15. A method according to claim 14 wherein n is 10.

16. The method according to claim 14 wherein the metal is mild steel.

17. The method according to claim 14 wherein the concentration of the compound of formula (I) in the aqueous medium is in the range of 0.5 to 5% by weight based on weight of aqueous medium.

18. The method according to claim 14 wherein the metal surface is contacted with the aqueous medium at a temperature in the range of 0° C. to 70° C.

19. The method according to claim 18 wherein the metal is brought into contact with the aqueous medium containing (I) for 0.5 to 40 minutes.

* * * * *